(12) United States Patent
Koss

(10) Patent No.: US 9,174,168 B2
(45) Date of Patent: Nov. 3, 2015

(54) FLUE GAS TREATMENT SYSTEM

(75) Inventor: Peter Ulrich Koss, Zollikon (CH)

(73) Assignee: ALSTOM Technology Ltd, Baden (CH)

( * ) Notice: Subject to any disclaimer, the term of this patent is extended or adjusted under 35 U.S.C. 154(b) by 588 days.

(21) Appl. No.: 13/508,591

(22) PCT Filed: Nov. 11, 2010

(86) PCT No.: PCT/IB2010/002891
§ 371 (c)(1),
(2), (4) Date: Jul. 26, 2012

(87) PCT Pub. No.: WO2011/058426
PCT Pub. Date: May 19, 2011

(65) Prior Publication Data
US 2013/0042759 A1 Feb. 21, 2013

(30) Foreign Application Priority Data
Nov. 12, 2009 (EP) .................................. 09175796

(51) Int. Cl.
*B01D 53/14* (2006.01)
*B01D 53/18* (2006.01)
(Continued)

(52) U.S. Cl.
CPC .............. *B01D 53/78* (2013.01); *B01D 53/507* (2013.01); *B01D 53/62* (2013.01);
(Continued)

(58) Field of Classification Search
CPC ...... B01D 53/507; B01D 53/62; B01D 53/78; B01D 2251/2062; B01D 2257/302; B01D 2257/504; Y02C 10/04; Y02C 10/06
See application file for complete search history.

(56) References Cited

U.S. PATENT DOCUMENTS

| 2,106,734 A | 2/1935 | Gollmar |
| 2,043,109 A | 6/1936 | McKee et al. |

(Continued)

FOREIGN PATENT DOCUMENTS

| AU | 648129 | 7/1992 |
| AU | 678622 | 6/1995 |

(Continued)

OTHER PUBLICATIONS

Department of Chemical Engineering, Heat Capacities in enthalpy and entropy calculations, Jul. 5 2014, University of California Santa Barbara, all pages. https://web.archive.org/web/20140705105248/http://engr.ucsb.edu/~shell/che110a/heatcapacitycalculations.pdf.*

(Continued)

*Primary Examiner* — Amber Orlando
*Assistant Examiner* — Britanny Precht
(74) *Attorney, Agent, or Firm* — Cynthia W. Flanigan

(57) ABSTRACT

The present invention relates to a gas cleaning system for cleaning a gas stream containing carbon dioxide and sulfur dioxide, said gas cleaning system comprising: a pre-conditioning section (3); a $CO_2$ removal stage (5); and a post-conditioning section (4); said pre-conditioning section comprising at least two gas-liquid contacting devices (19,20) arranged upstream of the $CO_2$ removal stage (5) with respect to the flow direction of the gas; and said post-conditioning section comprising at least two gas-liquid contacting devices (30,31) arranged downstream of the $CO_2$ removal stage with respect to the flow direction of the gas. The present invention further relates to a method for cleaning a gas stream containing carbon dioxide and sulfur dioxide, said method including removing, at least partly, carbon dioxide from the gas stream in a carbon dioxide removal step by bringing the gas stream into contact with a liquid comprising ammonia; contacting the gas stream with liquid in at least two steps upstream of the carbon dioxide removal step; and contacting the gas stream with liquid in at least two steps downstream of the carbon dioxide removal step.

10 Claims, 4 Drawing Sheets

(51) Int. Cl.
*B01D 53/78* (2006.01)
*B01D 53/50* (2006.01)
*B01D 53/62* (2006.01)

(52) U.S. Cl.
CPC .. *B01D 2251/2062* (2013.01); *B01D 2257/302* (2013.01); *B01D 2257/504* (2013.01); *Y02C 10/04* (2013.01); *Y02C 10/06* (2013.01)

(56) References Cited

U.S. PATENT DOCUMENTS

| | | |
|---|---|---|
| 2,487,576 A | 11/1949 | Meyers |
| 2,608,461 A | 8/1952 | Frazier |
| 2,878,099 A | 3/1959 | Breuing et al. |
| 3,255,233 A | 6/1966 | Kunze et al. |
| 3,923,955 A | 12/1975 | Fattinger |
| 4,515,760 A | 5/1985 | Lang et al. |
| 4,847,057 A | 7/1989 | Brugerolle et al. |
| 4,977,745 A | 12/1990 | Heichberger |
| 4,999,031 A | 3/1991 | Gerhardt et al. |
| 5,067,972 A | 11/1991 | Hemmings et al. |
| 5,137,550 A | 8/1992 | Hegarty et al. |
| 5,186,916 A | 2/1993 | Nevels |
| 5,318,758 A | 6/1994 | Fujii |
| 5,378,442 A | 1/1995 | Fujii et al. |
| 5,427,759 A | 6/1995 | Heitmann |
| 5,453,115 A | 9/1995 | Vuletić |
| 5,462,583 A | 10/1995 | Wood et al. |
| 5,599,508 A | 2/1997 | Martinelli et al. |
| 5,648,053 A | 7/1997 | Mimura et al. |
| 5,700,311 A | 12/1997 | Spencer |
| 5,756,058 A | 5/1998 | Watanabe et al. |
| 5,832,712 A | 11/1998 | Rønning et al. |
| 5,853,680 A | 12/1998 | Iijima et al. |
| 5,979,180 A | 11/1999 | Lebas et al. |
| 6,027,552 A | 2/2000 | Ruck et al. |
| 6,210,467 B1 | 4/2001 | Howard |
| 6,348,088 B2 | 2/2002 | Chung |
| 6,372,023 B1 | 4/2002 | Kiyono et al. |
| 6,458,188 B1 | 10/2002 | Mace |
| 6,485,547 B1 | 11/2002 | Iijima |
| 6,497,852 B2 | 12/2002 | Chakravarti et al. |
| 6,506,350 B2 | 1/2003 | Cooper et al. |
| 6,759,022 B2 | 7/2004 | Hammer et al. |
| 6,764,530 B2 | 7/2004 | Iijima |
| 7,022,296 B1 | 4/2006 | Khang et al. |
| 7,083,662 B2 | 8/2006 | Xu et al. |
| 7,128,777 B2 | 10/2006 | Spencer |
| 7,160,456 B2 | 1/2007 | Järventie |
| 7,255,842 B1 * | 8/2007 | Yeh et al. ........... 423/234 |
| 2003/0045756 A1 | 3/2003 | Mimura et al. |
| 2003/0140786 A1 | 7/2003 | Iijima |
| 2004/0123736 A1 | 7/2004 | Torres, Jr. et al. |
| 2004/0126294 A1 | 7/2004 | Cooper et al. |
| 2005/0169825 A1 | 8/2005 | Cadours et al. |
| 2006/0178259 A1 | 8/2006 | Schubert et al. |
| 2006/0204425 A1 | 9/2006 | Kamijo et al. |
| 2007/0006565 A1 | 1/2007 | Fleischer et al. |
| 2007/0256559 A1 * | 11/2007 | Chen et al. ........... 95/169 |
| 2008/0072762 A1 | 3/2008 | Gal |
| 2008/0178733 A1 | 7/2008 | Gal |
| 2008/0307968 A1 | 12/2008 | Kang et al. |
| 2009/0101012 A1 | 4/2009 | Gal et al. |
| 2009/0155889 A1 | 6/2009 | Handagama et al. |
| 2009/0282977 A1 | 11/2009 | Koss |

FOREIGN PATENT DOCUMENTS

| | | |
|---|---|---|
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| CN | 1211464 A | 3/1999 |
| DE | 469840 | 12/1928 |
| DE | 2832493 | 7/1978 |
| DE | 3633690 | 4/1988 |
| DE | 10 2005 033837 | 1/2007 |
| EP | 0243778 | 11/1987 |
| EP | 0502596 | 9/1992 |
| EP | 0553643 | 8/1993 |
| EP | 0588178 | 3/1994 |
| EP | 1759756 | 3/2007 |
| GB | 271852 | 5/1926 |
| GB | 871207 | 6/1961 |
| GB | 899611 | 6/1962 |
| GB | 2331526 | 5/1999 |
| GB | 2 454 266 | 5/2009 |
| JP | 10 202054 | 8/1998 |
| JP | 11 137960 | 5/1999 |
| KR | 100703999 B1 | 3/2007 |
| SU | 512785 | 5/1976 |
| SU | 1567251 | 5/1990 |
| WO | 98/47604 | 10/1998 |
| WO | 02/09849 | 2/2002 |
| WO | 02/089958 | 11/2002 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2006/022885 | 3/2006 |
| WO | 2008/072979 | 6/2008 |
| WO | 2008/094777 | 8/2008 |
| WO | 2008/101293 | 8/2008 |
| WO | 2008/144918 | 12/2008 |
| WO | 2009/000025 | 12/2008 |
| WO | 2009/003238 | 1/2009 |
| WO | 2010/053683 | 5/2010 |

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of CO2, SO2 and NOx," Int. J. Environmental Tech. And Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliminary Results" International Journal of Thermodynamics, International Centre for Applied Thermodynamics, Istanbul, TR, vol. 7, No. 4, Dec. 1, 2004, pp. 173-181.

"Semi-batch absorption and regeneration studies for CO2 capture by aqueous ammonia", Fuel Processing Technology, vol. 86, No. 14-15, Oct. 1, 2005, pp. 1533-1546.

* cited by examiner

FLUE GAS TREATMENT SYSTEM

FIELD OF THE INVENTION

The present invention relates to a gas cleaning system for cleaning a process gas containing carbon dioxide and sulfur dioxide, said gas cleaning system comprising a pre-conditioning section, which is operative for cooling the process gas and for removing $SO_2$, a carbon dioxide removal system comprising a $CO_2$ absorber which is operative for removing, at least partly, carbon dioxide from the process gas by bringing the cooled process gas into contact with a liquid comprising ammonia absorbing at least a part of the carbon dioxide, and a post-conditioning section which is operative for removing, at least partly, residual ammonia from the process gas.

The present invention also relates to a method of cleaning a gas containing carbon dioxide and sulfur dioxide, said method including removing, at least partly, carbon dioxide from the process gas by means of bringing the gas into contact with a liquid comprising ammonia, absorbing at least a part of the carbon dioxide.

BACKGROUND

In the combustion of a fuel, such as coal, oil, peat, waste, etc., in a combustion plant, such as a power plant, a hot process gas is generated, such a hot process gas, often referred to as a flue gas, containing, among other components, carbon dioxide, $CO_2$. The negative environmental effects of releasing carbon dioxide to the atmosphere have been widely recognized, and have resulted in the development of processes adapted for removing carbon dioxide from the hot process gas generated in the combustion of the above mentioned fuels.

US2008/0178733 presents a gas cleaning system having a combined cooling and cleaning system comprising a first gas-liquid contacting device located upstream of the $CO_2$ absorber and operative for cooling the process gas by means of a cooling liquid, and for absorbing into the cooling liquid sulfur dioxide of the process gas, such that a cooling liquid containing sulfate is obtained. The combined cooling and cleaning system further comprises a second gas-liquid contacting device located downstream of the $CO_2$ absorber and operative for removing ammonia from the process gas, which has been treated in the $CO_2$ absorber, by means of bringing the process gas containing ammonia into contact with the cooling liquid containing sulfate.

The system described in US2008/0178733 may be used to achieve one or more of the following aims:
1) Reducing the temperature of the process gas before it is fed to the $CO_2$ absorber,
2) Removing $SO_2$ from the process gas before it is fed to the $CO_2$ absorber,
3) Removing residual $NH_3$ from the process gas before it is discharged to the atmosphere,
4) Reheating the cold process gas from the $CO_2$ absorber to retain cold energy, thus reducing the overall cooling requirement of the system, However, several of these aims are opposing in nature. The variables available for optimizing the process in respect of these aims are coupled to each other to a large extent. This means that not all aims can be fulfilled simultaneously. Optimizing the process in respect of some aims will lead to poor results in respect of other aims.

Therefore, it would be desirable to have a process which would allow all of these aims to be fulfilled simultaneously.

SUMMARY OF THE INVENTION

An object of the present invention is to provide an efficient and environmentally acceptable method of removing carbon dioxide and sulfur dioxide from a gas stream.

According to aspects illustrated herein, there is provided a gas cleaning system for cleaning a gas stream containing carbon dioxide and sulfur dioxide, said gas cleaning system comprising:
a pre-conditioning section (3);
a $CO_2$ removal stage (5); and
a post-conditioning section (4);
said pre-conditioning section comprising:
a first gas-liquid contacting device (19) of the pre-conditioning section, arranged upstream of the $CO_2$ removal stage with respect to the flow direction of the gas and arranged to receive a gas stream containing carbon dioxide and sulfur dioxide and bring the gas into contact with a liquid;
a second gas-liquid contacting device (20) of the pre-conditioning section, arranged upstream of the $CO_2$ removal stage with respect to the flow direction of the gas and arranged to receive the gas discharged from the first gas-liquid contacting device of the pre-conditioning section and bring the gas into contact with a liquid;
said $CO_2$ removal stage comprising a $CO_2$ absorber (6) arranged to receive a gas stream from the pre-conditioning section, bring the gas stream into contact with a liquid comprising ammonia, and discharge a gas stream depleted in $CO_2$ to the post-conditioning section;
said post-conditioning section comprising:
a first gas-liquid contacting device (30) of the post-conditioning section, arranged downstream of the $CO_2$ removal stage with respect to the flow direction of the gas and arranged to receive the gas discharged from the $CO_2$ removal stage and bring the gas into contact with a liquid;
a second gas-liquid contacting device (31) of the post-conditioning section, arranged downstream of the first gas-liquid contacting device of the post-conditioning section with respect to the flow direction of the gas and arranged to receive the gas discharged from the second gas-liquid contacting device of the post-conditioning section and bring the gas into contact with a liquid;
wherein the second gas-liquid contacting device of one of said pre- and post-conditioning sections is arranged in liquid connection with a gas-liquid contacting device of the other of said sections, such that at least a portion of the used liquid from the second gas-liquid contacting device of one of said sections is directed for use in a gas-liquid contacting device of the other of said sections. In the prior art (US2008/0178733), a combined cooling and cleaning system is described, comprising one gas-liquid contacting device upstream of the $CO_2$ removal stage and one gas-liquid contacting device downstream of the $CO_2$ removal stage.

The gas cleaning system in the aspects illustrated herein comprises two or more gas-liquid contacting devices upstream of the $CO_2$ removal stage and two or more gas-liquid contacting devices downstream of the $CO_2$ removal stage. This increases the number of positions where liquid can be introduced in or withdrawn from each section. This, in turn, allows the process to be tailored, allowing different gas-liquid contacting devices to operate under different operating conditions since the liquid streams fed to the individual gas-liquid contacting devices can be controlled individually and be adapted to the specific requirements in the sections. Thus, in different embodiments one gas-liquid contacting device may be configured to operate at low pH, liquid flow rate, and/or temperature, while another gas-liquid contacting device is configured to operate at an intermediate pH, liquid flow rate, and/or temperature, or one gas-liquid contacting device may be configured to operate at low pH, liquid flow rate, and/or temperature, while another gas-liquid contacting device is configured to operate at an intermediate pH, liquid flow rate, and/or temperature, and yet another gas-liquid contacting device is configured to operate at high pH, liquid flow rate, and/or temperature.

In the pre- and post-conditioning sections the gas stream is brought into contact with liquid in a sequence of gas-liquid contacting devices. The gas stream is generally brought into contact with liquid in counter current mode, wherein the gas stream and the liquid stream enter and exit at opposite ends of the gas-liquid contacting device. The used liquid which is discharged from a gas-liquid contacting device of the pre- and post-conditioning sections may be withdrawn and discarded or fed to a different gas-liquid contacting device for reuse. Generally, if no used liquid which is discharged from the gas-liquid contacting device is withdrawn, the discharged liquid is directed to the previous gas-liquid contacting device in the sequence.

The used liquid from the first gas-liquid contacting device of the pre-conditioning section is generally directed to the final gas-liquid contacting device of the post-conditioning section.

The used liquid from the first gas-liquid contacting device of the post-conditioning section is generally directed to the final gas-liquid contacting device of the pre-conditioning section. This way a first liquid recirculation is formed.

In a system according to aspects described herein, liquid may also be withdrawn between two gas-liquid contacting devices of the pre-conditioning section or between two gas-liquid contacting devices of the post-conditioning section and the withdrawn liquid may be directed to a gas-liquid contacting device of the other section. This way a second liquid recirculation is formed.

The second liquid recirculation may be given properties different from those of the first liquid recirculation, for example in terms of liquid mass flow rate, pH value and/or temperature. Due to chemical and physical reactions which occur as the liquid is brought into contact with the gas stream, the liquid which is fed into a gas-liquid contacting device will generally differ in composition from the used liquid which is discharged from the gas-liquid contacting device. Accordingly, properties of the liquid, such as pH and temperature, may vary as the liquid proceeds through the recirculation.

For example, a minimum amount of liquid may be fed to the first gas-liquid contacting device of the pre-conditioning section such that a major portion of the $SO_2$ in the gas is absorbed in a low amount of liquid. As a result the pH of the liquid will decrease considerably. This liquid, having a low pH is well suited for removal of residual amounts of $NH_3$ in the post-conditioning section. In the second gas-liquid contacting device of the pre-conditioning section a larger amount of liquid may be desired in order to effectively cool the gas stream before it is fed to the $CO_2$ absorber. A major portion of this liquid may be withdrawn after it has been used in the second gas-liquid contacting device of the pre-conditioning section and used in the post-conditioning section for reheating the cold gas stream discharged from the $CO_2$ absorber.

According to one embodiment the second gas-liquid contacting device of one of said pre- and post-conditioning sections is arranged in liquid connection with the first gas-liquid contacting device of the other section, such that at least a portion of the used liquid from the second gas-liquid contacting device of one section is directed for use in the first gas-liquid contacting device of the other section. When the second gas-liquid contacting device of one of said pre- and post-conditioning sections is arranged in liquid connection with the first gas-liquid contacting device of the other section it is possible to provide an individual liquid flow rate to the first gas-liquid contacting device of one of the sections. This may be useful for, for example, obtaining a liquid stream having a high or low pH-value, or for matching the integral heat capacities of the gas stream and the liquid to minimize the cooling requirement of the system.

According to one embodiment the second gas-liquid contacting device of the pre-conditioning section and the first gas-liquid contacting device of the post-conditioning section are arranged in liquid connection, such that used liquid from the second gas-liquid contacting device of the pre-conditioning section may be directed for use in the first gas-liquid contacting device of the post-conditioning section.

According to another embodiment the second gas-liquid contacting device of the post-conditioning section and the first gas-liquid contacting device of the pre-conditioning section are arranged in liquid connection, such that used liquid from the second gas-liquid contacting device of the post-conditioning section may be directed for use in the first gas-liquid contacting device of the pre-conditioning section.

According to another embodiment the first gas-liquid contacting device of the pre-conditioning section and the second gas-liquid contacting device of the post-conditioning section are arranged in liquid connection, such that used liquid from the first gas-liquid contacting device of the pre-conditioning section may be directed for use in the second gas-liquid contacting device of the post-conditioning section. An advantage of this is that the liquid which has absorbed the most $SO_2$, and thereby generally has the lowest pH, is used for the final removal of residual $NH_3$ from the gas.

According to another embodiment the first gas-liquid contacting device of the post-conditioning section and the second gas-liquid contacting device of the pre-conditioning section are arranged in liquid connection, such that used liquid from the first gas-liquid contacting device of the post-conditioning section may be directed for use in the second gas-liquid contacting device of the pre-conditioning section. An advantage of this is that the liquid which has absorbed the most $NH_3$, and thereby generally has the highest pH, is used for the final removal of residual $SO_2$ from the gas.

According to an embodiment the liquid connection comprises a flow control device for operable for controlling the proportion of liquid which is directed for use in the other section.

In a another embodiment of the gas cleaning system, said pre-conditioning section further comprises: a third gas-liquid contacting device of the pre-conditioning section, arranged upstream of the $CO_2$ removal stage with respect to the flow direction of the gas and arranged to receive the gas discharged from the second gas-liquid contacting device and bring the gas into contact with a liquid; and said post-conditioning section further comprises: a third gas-liquid contacting device of the post-conditioning section, arranged downstream of the second gas-liquid contacting device with respect to the flow direction of the gas and arranged to receive the gas discharged from the second gas-liquid contacting device of the post-conditioning section and bring the gas into contact with a liquid; wherein the second gas-liquid contacting device of each of said pre- and post-conditioning sections is arranged in liquid connection with the second gas-liquid contacting device of the other section, such that at least a portion of the used liquid from the second gas-liquid contacting device of one section is directed for use in the second gas-liquid contacting device of the other section.

According to an embodiment, wherein the pre- and post-conditioning sections further comprise a third gas-liquid contacting device, the first gas-liquid contacting device of the pre-conditioning section and the third gas-liquid contacting device of the post-conditioning section are arranged in liquid connection, such that used liquid from the first gas-liquid contacting device of the pre-conditioning section may be directed for use in the third gas-liquid contacting device of the post-conditioning section.

According to an embodiment, wherein the pre- and post-conditioning sections further comprise a third gas-liquid contacting device, the first gas-liquid contacting device of the post-conditioning section and the third gas-liquid contacting device of the pre-conditioning section are arranged in liquid connection, such that used liquid from the first gas-liquid contacting device of the post-conditioning section may be directed for use in the third gas-liquid contacting device of the pre-conditioning section.

According to an embodiment, one or more of the liquid connection(s), such that least a portion of the used liquid from the second gas-liquid contacting device of one section is directed for use in a gas-liquid contacting device of the other section, comprises a flow control device for operable for controlling the proportion of liquid which is directed for use in a gas-liquid contacting device of the other section.

According to another aspect, there is provided a method for cleaning a gas stream containing carbon dioxide and sulfur dioxide, said method including removing, at least partly, carbon dioxide from the gas stream in a carbon dioxide removal step by bringing the gas stream into contact with a liquid comprising ammonia such that the gas stream is depleted in carbon dioxide and enriched in ammonia, said method comprising the steps of:

a) bringing the gas stream into direct contact with a liquid stream in a first upstream gas-liquid contacting device upstream of the carbon dioxide removal step, cooling the gas stream, and absorbing into the liquid at least a part of the sulfur dioxide of the gas stream such that the gas stream is depleted in sulfur dioxide and said liquid stream is enriched in sulfate, b) bringing the gas stream depleted in sulfur dioxide into direct contact with a liquid stream in a second upstream gas-liquid contacting device upstream of the carbon dioxide removal step, cooling the gas stream, and absorbing into the liquid at least a part of the sulfur dioxide of the gas stream such that the gas stream is depleted in sulfur dioxide and said liquid stream is enriched in sulfate, c) removing, at least partly, carbon dioxide from the gas stream by bringing the gas stream depleted in sulfur dioxide into contact with a liquid comprising ammonia such that the gas stream is depleted in carbon dioxide, d) bringing the gas stream depleted in carbon dioxide into contact with a liquid stream enriched in sulfate in a first downstream gas-liquid contacting device downstream of the carbon dioxide removal step, cooling the liquid stream, and absorbing into the liquid at least a part of the ammonia of the gas stream such that the gas stream is depleted in ammonia and said liquid stream is enriched in ammonia, e) bringing the gas stream depleted in ammonia into contact with a liquid stream enriched in sulfate in a second downstream gas-liquid contacting device downstream of the carbon dioxide removal step, cooling the liquid stream, and absorbing into the liquid at least a part of the ammonia of the gas stream such that the gas stream is depleted in ammonia and said liquid stream is enriched in ammonia, f) withdrawing at least a portion of the liquid stream used in the second upstream gas-liquid contacting device and reusing the withdrawn liquid in a downstream gas-liquid contacting device, or withdrawing at least a portion of the liquid stream used in the second downstream gas-liquid contacting device and reusing the withdrawn liquid in an upstream gas-liquid contacting device.

According to an embodiment, in step f) at least a portion of the liquid stream used in the second upstream gas-liquid contacting device, is reused in the first downstream gas-liquid contacting device.

According to an embodiment, in step f) at least a portion of the liquid stream used in the second downstream gas-liquid contacting device, is reused in the first upstream gas-liquid contacting device.

According to another embodiment, the method further comprises the steps:

b1) bringing the gas stream depleted in sulfur dioxide from step b) into direct contact with a liquid stream in a third upstream gas-liquid contacting device, upstream of the carbon dioxide removal, cooling the gas stream, and absorbing into the liquid at least a part of the sulfur dioxide of the gas stream such that the gas stream is depleted in sulfur dioxide and said liquid stream is enriched in sulfate, and e1) bringing the gas stream depleted in ammonia from step e) into contact with a liquid stream enriched in sulfate in a third downstream gas-liquid contacting device, downstream of the carbon dioxide removal, cooling the liquid stream, and absorbing into the liquid at least a part of the ammonia of the gas stream such that the gas stream is depleted in ammonia and said liquid stream is enriched in ammonia, wherein step f) comprises withdrawing at least a portion of the liquid stream used in the second upstream gas-liquid contacting device and reusing the withdrawn liquid in a downstream gas-liquid contacting device, and withdrawing at least a portion of the liquid stream used in the second downstream gas-liquid contacting device and reusing the withdrawn liquid in an upstream gas-liquid contacting device.

According to an embodiment further comprising the steps b1) and e1), in step f) a major portion of the liquid stream used in the second upstream gas-liquid contacting device is withdrawn and reused in the second downstream gas-liquid contacting device and a minor portion of the liquid stream used in the second upstream gas-liquid contacting device is reused in the first upstream gas-liquid contacting device, and a major portion of the liquid stream used in the second downstream gas-liquid contacting device is withdrawn and reused in the second upstream gas-liquid contacting device and a minor portion of the liquid stream used in the second downstream gas-liquid contacting device is reused in the first downstream gas-liquid contacting device.

According to another embodiment further comprising the steps b1) and e1), used liquid from the first upstream gas-liquid contacting device is reused in the third downstream gas-liquid contacting device.

According to another embodiment further comprising the steps b1) and e1), used liquid from the first downstream gas-liquid contacting device is reused in the third upstream gas-liquid contacting device.

According to an embodiment the liquid stream which is brought into contact with the gas stream in e1) has a pH of <6.5.

According to an embodiment the liquid stream which is brought into contact with the gas stream in step b1) has a pH of >6.5.

According to an embodiment the liquid flow rate in steps b1) and/or d) is controlled such that in at least one of the steps b1) and/or d) the integral heat capacities of the gas stream and the liquid stream entering the gas-liquid contacting device differ by less than 10%.

According to an embodiment, the method may be performed in a gas cleaning system as described further herein.

Further objects, features and advantages of the present invention will be apparent from the description and the claims. The above described and other features are exemplified by the following figures and detailed description.

BRIEF DESCRIPTION OF THE DRAWINGS

Many aspects of the invention can be better understood with reference to the following drawings. The figures are exemplary embodiments, wherein the like elements are numbered alike.

DETAILED DESCRIPTION OF PREFERRED EMBODIMENTS

As used throughout the present description the unit "ppm" refers to parts per million on a volume basis.

As used throughout the present description the unit "%" refers to % on a volume basis.

As described in US 2008/0178733, the gas cleaning system may for example be useful in a power plant in which combustion of a fuel takes place in a boiler. During the combustion of a fuel, such as coal or oil, a hot process gas, often referred to as a flue gas, is generated. The flue gas, which contains polluting substances, including dust particles, sulfur dioxide, $SO_2$, sulfur trioxide, $SO_3$, and carbon dioxide, $CO_2$, leaves the boiler via a gas duct. The gas duct is operative for forwarding the flue gas to a conventional air pollution control system. The flue gas forwarded from the conventional air pollution control system typically has a temperature of 49-60° C., is at ambient pressure, and is saturated with water.

Figure 1:
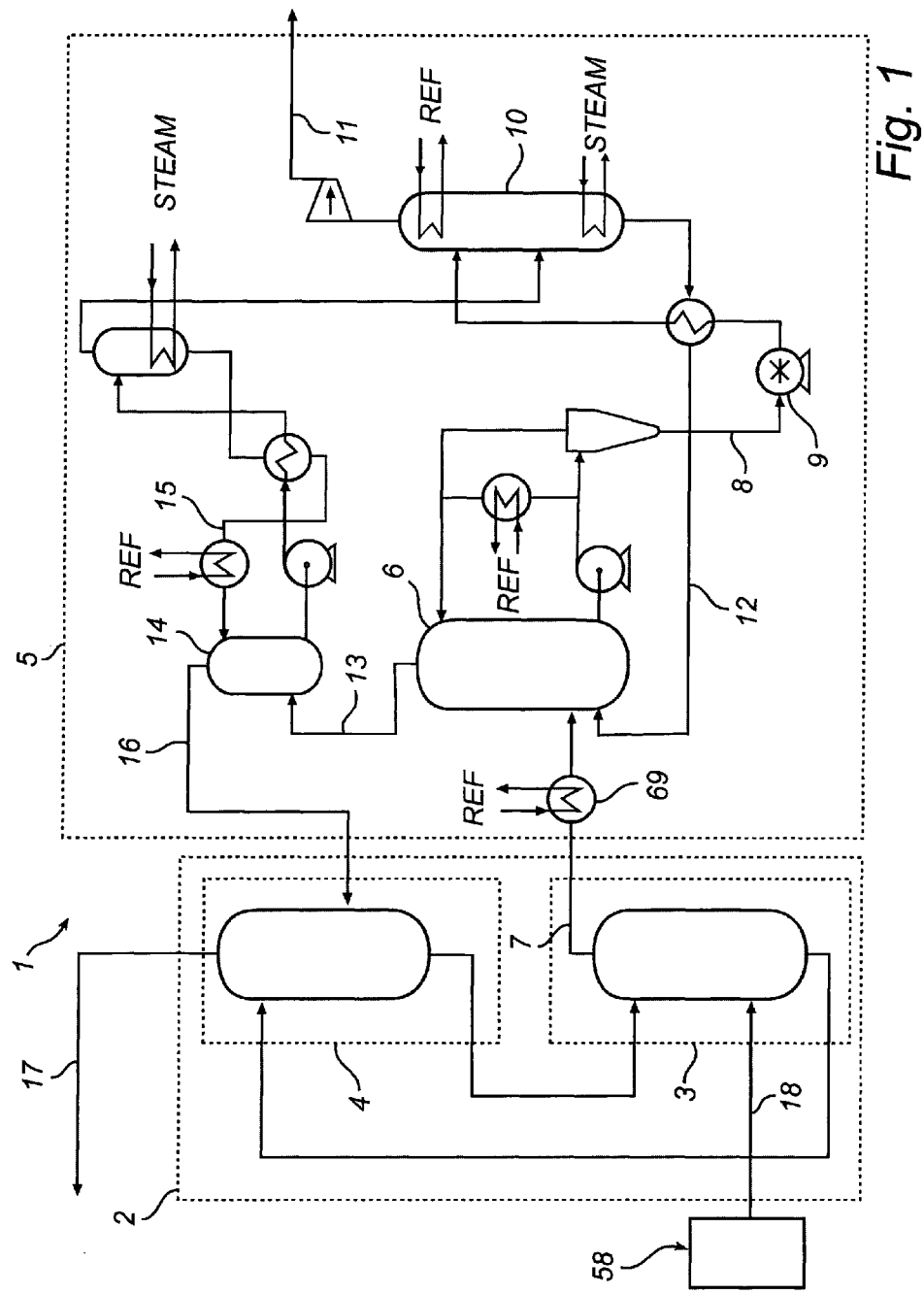
FIG. 1 is a schematic side view depicting an example of a gas cleaning system.

FIG. 1 illustrates schematically an embodiment of the gas cleaning system 1. The system comprises a gas conditioning stage 2 having a pre-conditioning section 3 and a post-conditioning section 4, and a $CO_2$ removal stage 5 comprising a $CO_2$ absorber 6.

The flue gas leaves the pre-conditioning section 3 via a duct 7. The flue gas in the duct 7 has a temperature of 0-20° C., preferably 0-10° C. The duct 7 is operative for forwarding the flue gas to the $CO_2$ removal stage 5. The flue gas in duct 7 may be subjected to one or more indirect coolers 69 operative for cooling the flue gas to the desired temperature of 0-20° C., preferably 0-10° C. before it is fed to the $CO_2$ absorber 6.

The $CO_2$ removal stage 5 is rather similar to the carbon dioxide removal system described in WO 2006/022885. The type of carbon dioxide removal system described in WO 2006/022885 is sometimes referred to as the Chilled Ammonia Process, CAP. A flue gas temperature of 0-20° C., preferably 0-10° C., is suitable for the $CO_2$ removal stage 5.

Hence, the $CO_2$ removal stage 5 comprises, with reference to FIG. 1 of the present application, a $CO_2$ absorber 6 in which the flue gas is brought into contact with a liquid comprising ammonia in a similar manner as described in WO 2006/022885. A pipe 8 is operative for forwarding, by means of a high pressure pump 9 a $CO_2$-enriched slurry or solution from the $CO_2$ absorber 6 to a regenerator 10. Heat is provided to the regenerator 10 by a heater. The high pressure and high temperature in the regenerator 10 causes the release of high-pressure gaseous $CO_2$, stream 11. A pipe 12 is operative for returning $CO_2$-lean ammoniated solution or slurry, that has been cooled in a cooler from the regenerator 10 to the $CO_2$ absorber 6.

A duct 13 is operative for forwarding flue gas, having a low concentration of $CO_2$, from the $CO_2$ absorber 6 to a water wash vessel 14, which is optional and which is operative for removing ammonia, $NH_3$, from the flue gas that has been treated in the $CO_2$ absorber 6. The water wash vessel 14 could have a similar design as the water wash vessel described in WO 2006/022885. A stream of cold water or cold and slightly acidic solution is supplied to the water wash vessel 14 via pipe 15. A duct 16 is operative for forwarding flue gas, that has been cleaned in the water wash vessel 14, to the gas conditioning stage 2 for further cleaning, as will be described in more detail hereinafter.

A duct 17 is operative for forwarding flue gas, that has been cleaned further in the post-conditioning system 2, to a stack which releases the cleaned flue gas to the atmosphere.

The gas conditioning stage 2 has a pre-conditioning section 3 and a post-conditioning section 4, each comprising two or more gas-liquid contacting devices. The pre- and post-conditioning sections are arranged in liquid connection such that liquid used in one section may be reused in the other section.

The gas-liquid contacting devices of the pre- and post-conditioning sections may be arranged as separate gas-liquid contacting vessels connected in series, such that the flue gas stream enters and exits each gas-liquid contacting vessel in sequence.

The gas-liquid contacting devices of the pre- and post-conditioning sections may alternatively be integrated in vessels comprising more than one gas-liquid contacting device arranged in sequence, such that a flue gas stream which is fed to the vessel enters and exits each gas-liquid contacting device in sequence, before exiting the vessel. Such integrated vessels may reduce capital costs for vessels and foundations, and require a smaller footprint on the plant site.

Each gas-liquid contacting device is arranged to bring the gas stream into contact with a liquid. The contacting may preferably be performed in counter current flow such that the gas enters the gas-liquid contacting device at one end (typically at the bottom) and the liquid enters the gas-liquid contacting device at the other end (typically at the top). Liquid used in one gas-liquid contacting device is generally directed for reuse in the previous (upstream) gas-liquid contacting device with respect to the main flow direction of the gas stream. The liquid used in the first (bottom) gas-liquid contacting device of the pre-conditioning section is generally directed for reuse in the final (top) gas-liquid contacting device of the post-conditioning section.

The liquid, also referred to herein as cooling liquid, is generally water or an aqueous solution. The liquid may contain amounts of contaminants absorbed from the gas stream such as ammonia, sulfate and derivatives thereof, such as ammonium sulfate.

The term "liquid collection receptacle", as used herein, refers generally to a device designed, arranged and configured to collect at least a portion of a liquid flow in the gas conditioning stage. The liquid collection receptacle is operative for collecting and withdrawing liquid between two gas-liquid contacting devices while allowing the gas stream to pass the liquid collection receptacle.

The "liquid collection receptacle" may be provided in different physical shapes depending on the design of the pre- and post-conditioning sections of the gas cleaning system.

If the pre- and post-conditioning sections are arranged as separate gas-liquid contacting vessels connected in series, the "liquid collection receptacle" can be constituted by the bottom portion of the vessel and/or by a storage or buffer tank in liquid connection with the bottom portion of the vessel, such that liquid exiting the gas-liquid contacting device of the vessel is collected therein.

The liquid collection receptacle may also be arranged or configured such that the flue gas stream may pass through or alongside the liquid collection receptacle. Such liquid collection receptacles may be especially useful if the pre- and/or post-conditioning sections comprise an integrated vessel having two or more gas-liquid contacting devices, wherein a liquid collection receptacle is inserted between two gas-liquid contacting devices. The liquid collection receptacles may for example comprise a sloped collection tray or bubble cap tray. The liquid collection receptacles may further comprise one or more liquid outlets configured for removal of the collected liquid.

The portion of liquid withdrawn by the liquid collection receptacle may be varied by means of a liquid flow regulating device, such as for example a valve. The portion may be variable between 0-100% of the used liquid coming from the gas-liquid contacting device, such as in the range of 1-99% or 10-90%. Preferably, a major amount of the liquid may be withdrawn by the liquid collection receptacle, i.e. more than 50% but less than 100%, such as more than 60%, 70%, 80% or 90% but less than 100%. In an embodiment, the withdrawal may be performed by withdrawing essentially all of the used liquid coming from one gas-liquid contacting device and returning a desired portion (generally less than 50%) of the withdrawn liquid to another gas-liquid contacting device of the same section.

The amount of liquid in the liquid loop of the gas conditioning stage may preferably be kept essentially constant. Variations in the amount of liquid in the loop may be compensated by the addition or removal of liquid to the loop. Generally, the incoming flue gas to be cleaned will contain a certain amount of water vapor, which is at least partly condensed when the gas is cooled in the pre-conditioning section leading to an increase of the amount of liquid in the loop. This increase should preferably be balanced by a corresponding decrease. This decrease may be achieved, e.g. by water vapor leaving the system with the cleaned flue gas, or in different cooling devices, such as cooling towers, or by cooling liquid leaving the system in one or more bleed streams.

Hereinbelow, various embodiments of the gas conditioning stage will be described in detail.

Figure 2A:
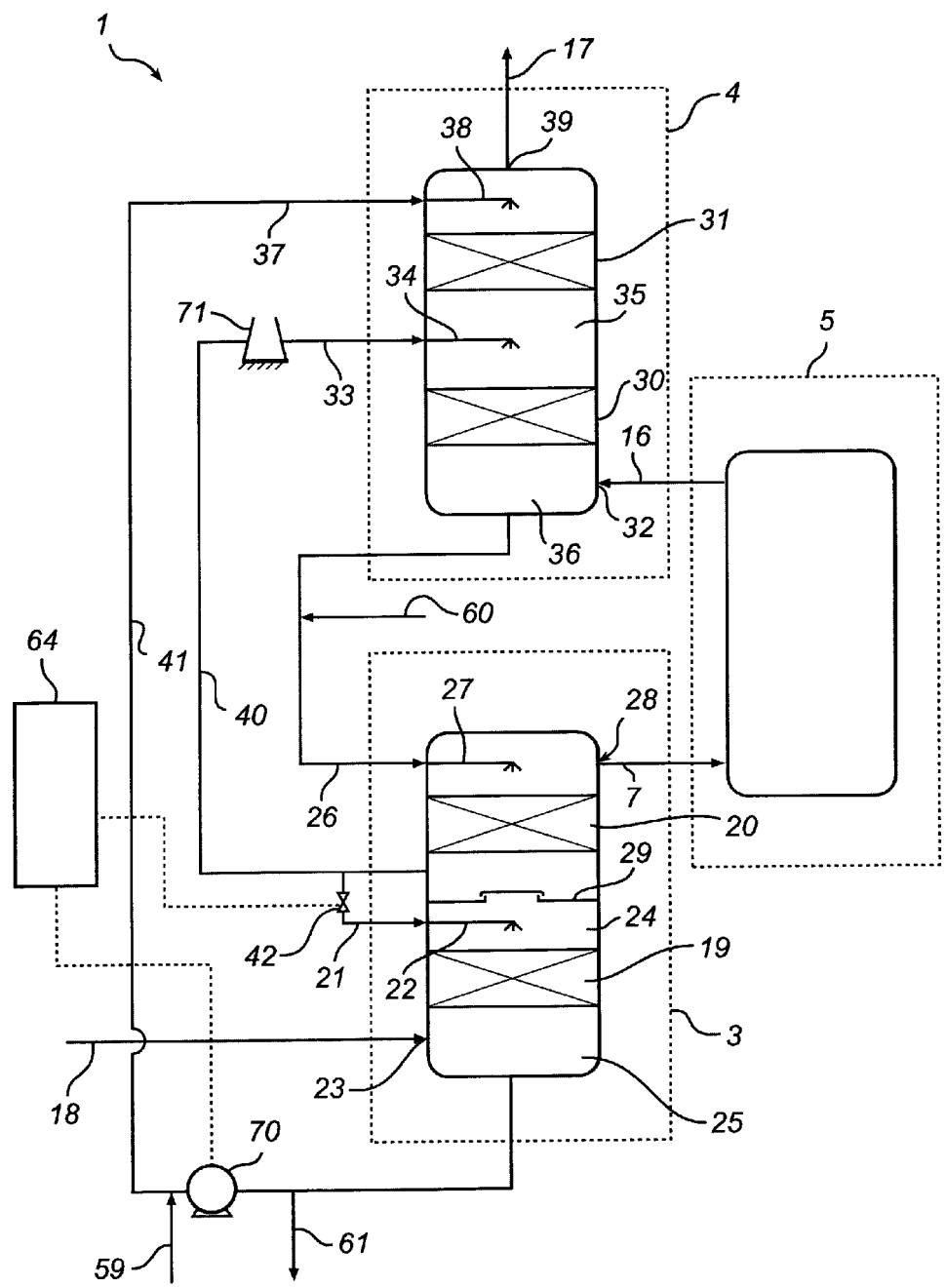
FIG. 2a is a schematic side view depicting an example of a gas cleaning system.

FIG. 2a illustrates an embodiment of the gas conditioning stage 2 of the gas cleaning system in more detail. The flue gas, optionally processed in a conventional air pollution control system as described above, enters the pre-conditioning section 3 via the duct 18.

The pre-conditioning section 3 comprises two gas-liquid contacting devices 19, 20 arranged separately and in sequence with respect to the main flow direction of the flue gas stream.

The flue gas first reaches a first gas-liquid contacting device 19, also referred to herein as the first direct contact cooler (DCC). The first DCC 19 is operative for cooling of the flue gas by contacting it directly with a cooling liquid having a temperature of, for example, 20° C., which is supplied via a pipe 21. A set of nozzles 22 is operative for distributing the liquid over the gas-liquid contacting device 19, which could have the form of a structured packing, or another suitable type of gas-liquid contacting filling. The flue gas, having a temperature of, for example, 57° C., enters the first DCC 19 via a gas inlet 23 and is forwarded upwards, through the gas-liquid contacting device 19. The flue gas leaves the first DCC 19 at a reduced temperature via a duct 24. The cooling liquid and the flue gas are contacted with each other in the gas-liquid contacting device 19 under exchange of heat. The warm cooling liquid used in the first DCC is collected in a tank 25 located at the bottom of the first DCC 19.

The flue gas leaving the first DCC 19 via duct 24 passes through a liquid collection receptacle 29 and then reaches a second gas-liquid contacting device 20, also referred to herein as the second DCC. The second DCC 20 is operative for further cooling of the flue gas by contacting it directly with a cooling liquid having a temperature of, for example, 15° C., which is supplied via a pipe 26. A set of nozzles 27 is operative for distributing the liquid over the gas-liquid contacting device 20, which could have the form of a structured packing, or another suitable type of gas-liquid contacting filling. The flue gas, having a temperature of, for example, 30° C., enters the second DCC 20 via duct 24 and is forwarded upwards, through the gas-liquid contacting device 20. The flue gas leaves the second DCC 20 at a temperature of, for example, 21° C. via a gas outlet 28. The second liquid and the flue gas are contacted with each other in the gas-liquid contacting device 20 under exchange of heat. The warm second liquid used in the second DCC is collected, at least in part by a liquid collection receptacle 29 located the at the bottom of the second DCC 20.

The post-conditioning section 4 comprises two gas-liquid contacting devices 30, 31 arranged separately and in sequence with respect to the main flow direction of the flue gas stream.

The post-conditioning section 4 comprises a first gas-liquid contacting device 30, also referred to herein as the first direct contact heater (DCH). The first DCH 30 is operative for heating of the cool flue gas that has passed through the entire $CO_2$ removal stage 5, and which is forwarded to a gas inlet 32 of the first DCH 30 by means of the duct 16, by contacting it directly with a cooling liquid having a temperature of, for example, 25° C., which is supplied by means of the pipe 33. The flue gas, from which most of the $CO_2$ has been removed in the $CO_2$ removal stage 5, has, when it enters the gas inlet 32, a temperature of, for example, 5° C. A set of nozzles 34 is operative for distributing the liquid over the gas-liquid contacting device 30, which could have the form of a structured packing, or another suitable type of gas-liquid contacting filling. The flue gas enters the first DCH 30 via a gas inlet 32 and is forwarded upwards, through the gas-liquid contacting device 30. The flue gas leaves the first DCC 30 at a higher temperature via a duct 35. The cooling liquid and the flue gas are contacted with each other in the gas-liquid contacting device 30 under exchange of heat. The cooled cooling liquid used in the first DCH 30 is collected in a tank 36 located at the bottom of the first DCH 30.

The flue gas leaving the first DCH 30 via duct 35 then reaches a second gas-liquid contacting device 31, also referred to herein as the second DCH. The second DCH 31 is operative for further heating of the flue gas by contacting it directly with a cooling liquid having a temperature of, for example, 20° C., which is supplied via a pipe 37. A set of nozzles 38 is operative for distributing the liquid over the gas-liquid contacting device 31, which could have the form of a structured packing, or another suitable type of gas-liquid contacting filling. The flue gas, having a temperature of, for example, 15° C., enters the second DCH 31 via duct 35 and is forwarded upwards, through the gas-liquid contacting device 31. The cooling liquid and the flue gas are contacted with each other in the gas-liquid contacting device 31 under exchange of heat. The cooled cooling liquid is directed to the first DCH 30 for use as cooling liquid. The flue gas leaves the second DCH 31 at a temperature of, for example, 25° C. via a gas outlet 39. The gas outlet 39 is connected to a duct 17, which is operative for forwarding the cleaned flue gas from the gas cleaning system 1 to the stack.

At least a major portion of the cooling liquid used in each gas-liquid contacting device of the gas-conditioning system is collected and reused in the same or another gas-liquid contacting device of the gas-conditioning system. Thus, a loop of recirculating cooling liquid is formed.

In the embodiment depicted in FIG. 2a, at least a portion of the liquid used in the second DCC 20 is collected and withdrawn by a liquid collection receptacle 29 and sent via pipe 40 to the first DCH 30 for reuse, the remaining, non-withdrawn liquid used in the second DCC 20 is sent to the first DCC 19, at least a portion of the liquid used in the first DCC 19 is collected and sent to the second DCH 31 via pipe 41, the liquid used in the second DCH 31 is sent to the first DCH 30 and joined with the liquid coming from the second DCC 20 via pipe 40, and the liquid used in the first DCH 30 is sent to the second DCC 20 via pipe 26.

The portion of liquid withdrawn by the liquid collection receptacle 29 may be varied by means of a liquid flow regulating device 42, such as for example a valve. The portion may be variable between 0-100% of the used liquid coming from the gas-liquid contacting device, such as in the range of 1-99%, 10-90%. Preferably, a major amount of the liquid may be withdrawn by each liquid collection receptacle, i.e. more than 50% but less than 100%, such as more than 60%, 70%, 80% or 90% but less than 100%. In an embodiment, as shown in FIG. 2a, the withdrawal may be performed by withdrawing essentially all of the used liquid coming from the second DCC 20 and then returning a desired portion (generally less than 50%) of the withdrawn liquid to the first DCC 19 and forwarding the remaining portion (generally more than 50%) of the withdrawn liquid to the first DCH 30.

The incoming flue gas processed in a conventional air pollution control system generally contains residual sulfur dioxide, $SO_2$, that was not captured in the sulfur dioxide removal device, described hereinbefore. The first DCC 19 is also a high efficiency $SO_2$ absorber operating at low temperature and in the pH range of about 4-6. Absorption of $SO_2$ into a cooling liquid containing water makes the cooling liquid slightly acidic.

Practically all the residual $SO_2$ in the flue gas will be captured in the first DCC 19 as well as a major portion of the sulfur trioxide, $SO_3$. The pH control requires a balancing act as will be explained later. Due to the low concentration of $SO_2$ in the flue gas, as mentioned hereinbefore the concentration of $SO_2$ in the incoming flue gas may typically be 20-200 ppm, the sulfite, $SO_3^{2-}$ (aq), formed in the first DCC 19 as a result of the absorption of $SO_2$ in the cooling liquid would naturally become oxidized to sulfate. The sulfuric acid, $H_2SO_4$, thus formed will dissociate in the aqueous solution, and will decrease the pH of the cooling liquid.

The cooling liquid leaving the first DCC 19 via the pipe 41 has a rather low pH, thanks to the absorption of $SO_2$, and is utilized, as will be described hereinafter, for removing ammonia from the flue gas coming from the $CO_2$ removal stage 5 via the duct 16, in the post-conditioning section 4.

The flue gas, from which most of the carbon dioxide has been removed, enters the post-conditioning section 4 via the gas inlet 32. The flue gas entering the post-conditioning section 4 contains about 100-1000 ppm of ammonia, $NH_3$, and more typically 200-400 ppm of ammonia, depending on the design and operating conditions of the ammonia wash system, i.e., the water wash vessel 14 described hereinbefore. For environmental reasons and in order to reduce ammonia losses from the process, the ammonia concentration of the flue gas discharged to the atmosphere should be lower than about 10 ppm, and preferably less than about 1 ppm. This can be achieved in the post-conditioning section using the acidic cooling liquid from the first DCC 19.

Thus, the post-conditioning section 4 is utilized for acid wash of ammonia from the flue gas that has passed through the $CO_2$ removal stage 5, described hereinbefore with reference to FIG. 1, and utilizes as a source of this acid wash sulfur dioxide, $SO_2$, that has been removed from the flue gas before such flue gas enters the $CO_2$ removal stage 5 and that has been oxidized to sulfate in the pre-conditioning section 3. The slightly acidic cooling liquid, supplied via the pipe 41 to the post-conditioning section 4, is an excellent absorbent for the highly soluble low concentration gaseous ammonia of the flue gas.

A gas cleaning system according to this embodiment gives the advantage of allowing heat transfer and $SO_2$ removal or $NH_3$ removal to be optimized simultaneously. In the embodiment of FIG. 2a, $NH_3$ removal may be optimized by the provision of a final gas-liquid contacting step in the post-conditioning section wherein the cooling liquid has a low pH value due to a low liquid mass flow rate in the first DCC 19 and in the second DCH 31, while maintaining optimal cooling of the incoming flue gas and cold recovery from the treated flue gas due to a high liquid mass flow rate in the second DCC 20 and in the first DCH 30.

Furthermore, a gas cleaning system according to this embodiment allows minimizing of the temperature differences on both ends of the first DCC 19 and the second DCH 31 respectively, i.e. minimizing temperature difference between incoming gas and exiting liquid at one end of the device, and the temperature difference between incoming liquid and exiting gas at the other end of the device. As described more in detail below, this can help to reduce the overall cooling requirement of the gas cleaning system.

Figure 2B:
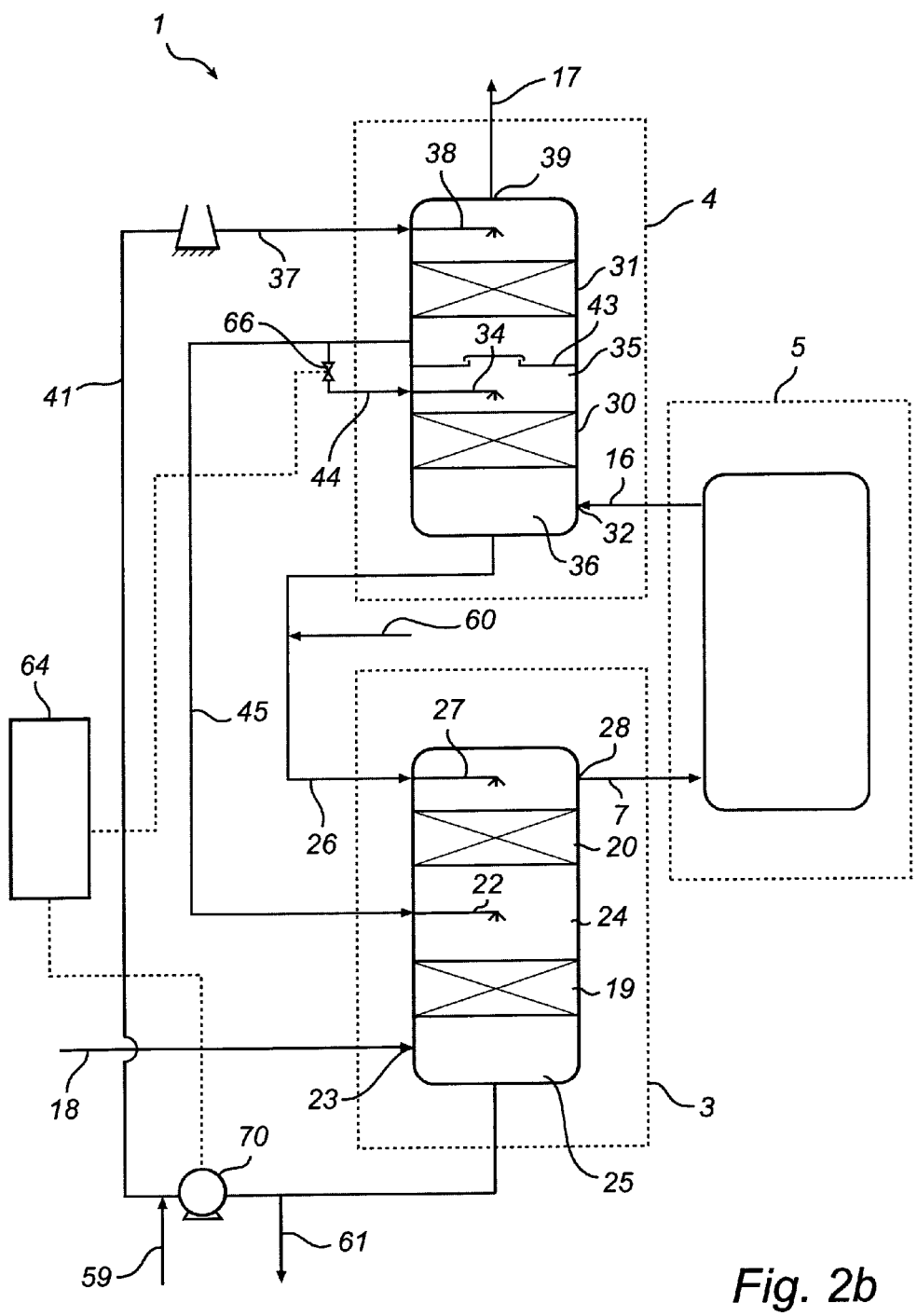
FIG. 2b is a schematic side view depicting an example of a gas cleaning system.

FIG. 2b illustrates an embodiment of the gas conditioning stage 2 of the gas cleaning system in more detail. The embodiment of FIG. 2b is similar to that of FIG. 2a, with the difference that cooling liquid is withdrawn from the post-conditioning section 4 and sent to the pre-conditioning section 3, instead of the other way around, as shown in FIG. 2a.

Thus, in the embodiment of FIG. 2b, cooled cooling liquid used in the second DCH 31 is collected, at least in part, by a liquid collection receptacle 43 located the at the bottom of the second DCH 31.

In the embodiment depicted in FIG. 2b, at least a portion of the cooling liquid used in the second DCH 31 is collected and withdrawn by the liquid collection receptacle 43 located the at the bottom of the second DCH 31 and sent via pipe 45 to the first DCC 19 for reuse, the remaining, non-withdrawn liquid used in the second DCH 31 is sent to the first DCH 30, the liquid used in the first DCH 30 is collected and sent to the second DCC 20 via pipe 26, the liquid used in the second DCC 20 is sent to the first DCC 19 and joined with the liquid coming from the second DCH 31 via pipe 45, and the liquid used in the first DCC 19 is sent to the second DCH 31.

The portion of liquid withdrawn by the liquid collection receptacle 43 may be varied by means of a liquid flow regulating device, such as for example a valve. The portion may be variable between 0-100% of the used liquid coming from the gas-liquid contacting device, such as in the range of 1-99%, 10-90%. Preferably, a major amount of the liquid may be withdrawn by the liquid collection receptacle, i.e. more than 50% but less than 100%, such as more than 60%, 70%, 80% or 90% but less than 100%. In an embodiment, as shown in FIG. 2b, the withdrawal may be performed by withdrawing essentially all of the used liquid coming from the second DCH 31 and then returning a desired portion (generally less than 50%) of the withdrawn liquid to the first DCH 30 and forwarding the remaining portion (generally more than 50%) of the withdrawn liquid to the first DCC 19.

A gas cleaning system according to this embodiment gives the advantage of allowing heat transfer and $SO_2$ removal or $NH_3$ removal to be optimized simultaneously. In the embodiment of FIG. 2b, $SO_2$ removal may be optimized by the provision of a final gas-liquid contacting step in the preconditioning section wherein the cooling liquid has a high pH value due to a low liquid mass flow rate in the first DCH 30 and in the second DCC 20, while maintaining optimal cooling of the incoming flue gas and cold recovery from the treated flue gas due to a high liquid mass flow rate in the first DCC 19 and in the second DCH 31.

Furthermore, a gas cleaning system according to this embodiment allows minimizing of the temperature differences on both ends of the second DCC 20 and the first DCH 30 respectively, i.e. minimizing the temperature difference between incoming gas and exiting liquid at one end of the device, and the temperature difference between incoming liquid and exiting gas at the other end of the device. As described more in detail below, this can help to reduce the overall cooling requirement of the gas cleaning system.

Figure 2C:
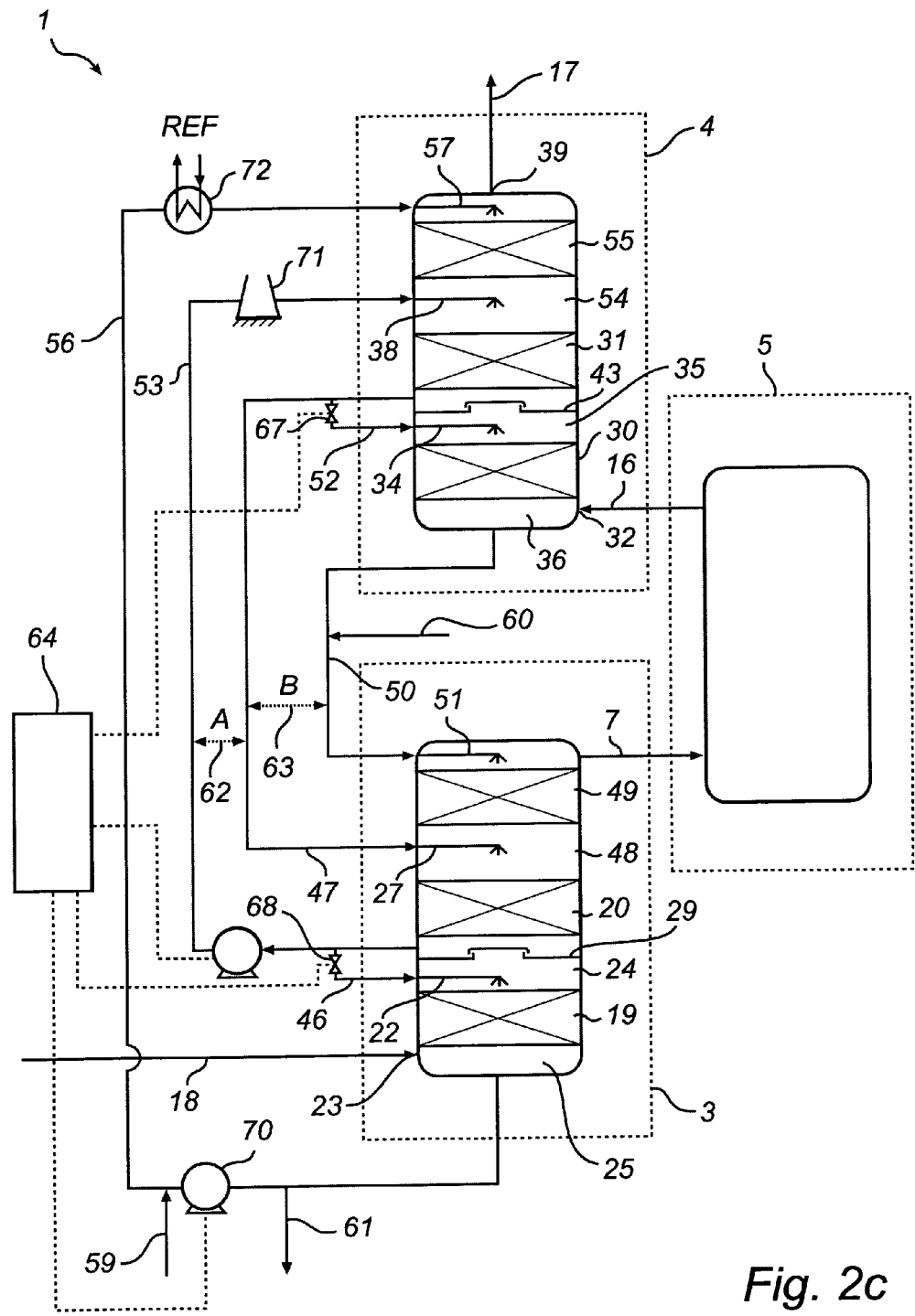
FIG. 2c is a schematic side view depicting an example of a gas cleaning system.

FIG. 2c illustrates an embodiment of the gas conditioning stage 2 of the gas cleaning system in more detail. The flue gas, optionally processed in a conventional air pollution control system as described above, enters the pre-conditioning section 3 via the duct 18.

The pre-conditioning section 3 comprises three gas-liquid contacting devices arranged separately and in sequence with respect to the main flow direction of the flue gas stream.

The flue gas first reaches a first gas-liquid contacting device 19, also referred to herein as the first DCC. The first DCC 19 is operative for cooling of the flue gas by contacting it directly with a cooling liquid having a temperature of, for example, 20° C., which is supplied via a pipe 46. A set of nozzles 29 is operative for distributing the liquid over the gas-liquid contacting device 19, which could have the form of a structured packing, or another suitable type of gas-liquid contacting filling. The flue gas, having a temperature of, for example, 57° C., enters the first DCC 19 via a gas inlet 23 and is forwarded upwards, through the gas-liquid contacting device 19. The flue gas leaves the first DCC 19 at a reduced temperature via a duct 24. The cooling liquid and the flue gas are contacted with each other in the gas-liquid contacting device 19 under exchange of heat. The warm cooling liquid used in the first DCC is collected in a tank 25 located at the bottom of the first DCC 19.

The flue gas leaving the first DCC 19 via duct 24 passes through a liquid collection receptacle 29 and then reaches a second gas-liquid contacting device 20, also referred to herein as the second DCC. The second DCC 20 is operative for further cooling of the flue gas by contacting it directly with a second liquid in the form of cooling liquid having a temperature of, for example, 15° C., which is supplied via a pipe 47. A set of nozzles 27 is operative for distributing the liquid over the gas-liquid contacting device 20, which could have the form of a structured packing, or another suitable type of gas-liquid contacting filling. The flue gas, having a temperature of, for example, 35° C., enters the second DCC 20 via duct 24 and is forwarded upwards, through the gas-liquid contacting device 20. The flue gas leaves the second DCC 20 at a temperature of, for example, 25° C. via duct 48. The second liquid and the flue gas are contacted with each other in the gas-liquid contacting device 20 under exchange of heat. The warm second liquid used in the second DCC is collected, at least in part by a liquid collection receptacle 29 located the at the bottom of the second DCC 20.

The flue gas leaving the second DCC 20 via duct 48 then reaches a third gas-liquid contacting device 49, also referred to herein as the third DCC. The third DCC 49 is operative for further cooling of the flue gas by contacting it directly with a cooling liquid having a temperature of, for example, 10° C., which is supplied via a pipe 50. A set of nozzles 51 is operative for distributing the liquid over the gas-liquid contacting device 49, which could have the form of a structured packing, or another suitable type of gas-liquid contacting filling. The flue gas, having a temperature of, for example, 25° C., enters the third DCC 49 via duct 48 and is forwarded upwards, through the gas-liquid contacting device 49. The flue gas leaves the third DCC 49 at a temperature of, for example, 21° C. via duct 7. The cooling liquid and the flue gas are contacted with each other in the gas-liquid contacting device 49 under exchange of heat. The warm cooling liquid is directed to the second DCH 20 for use as cooling liquid and is subsequently collected, at least in part by the liquid collection receptacle 29 located the at the bottom of the second DCC 20, as described above.

Referring to FIG. 2c, the post-conditioning section 4 comprises three gas-liquid contacting devices arranged separately and in sequence with respect to the main flow direction of the flue gas stream.

The post-conditioning section 4 comprises a first gas-liquid contacting device 30, also referred to herein as the first DCH. The first DCH 30 is operative for heating of the cool flue gas that has passed through the entire $CO_2$ removal stage 5, and which is forwarded to a gas inlet 32 of the first DCH 30 by means of the duct 16, by contacting it directly with a cooling liquid which is supplied by means of the pipe 52. The flue gas, from which most of the $CO_2$ has been removed in the $CO_2$ removal stage 5, has, when it enters the gas inlet 32, a temperature of, for example, 5° C. A set of nozzles 34 is operative for distributing the liquid over the gas-liquid contacting device 30, which could have the form of a structured packing, or another suitable type of gas-liquid contacting filling. The flue gas enters the first DCH 30 via a gas inlet 32 and is forwarded upwards, through the gas-liquid contacting device 32. The flue gas leaves the first DCH 30 at a higher temperature via a duct 35. The cooling liquid and the flue gas are contacted with each other in the gas-liquid contacting device 30 under exchange of heat. The cooled cooling liquid used in the first DCH 30 is collected in a tank 36 located at the bottom of the first DCH 30.

The flue gas leaving the first DCH 30 via duct 35 passes through a liquid collection receptacle 43 and then reaches a second gas-liquid contacting device 31, also referred to herein as the second DCH. The second DCH 31 is operative for further heating of the flue gas by contacting it directly with a cooling liquid having a temperature of, for example, 30° C., which is supplied via a pipe 53. A set of nozzles 38 is operative for distributing the liquid over the gas-liquid contacting device 31, which could have the form of a structured packing, or another suitable type of gas-liquid contacting filling. The flue gas, having a temperature of, for example, 15° C., enters the second DCH 31 via duct 35 and is forwarded upwards, through the gas-liquid contacting device 31. The flue gas leaves the second DCH 31 via duct 54. The cooling liquid and the flue gas are contacted with each other in the gas-liquid contacting device 31 under exchange of heat. The cooled cooling liquid used in the second DCH 31 is collected, at least in part by a liquid collection receptacle 43 located the at the bottom of the second DCH 31.

The flue gas leaving the second DCH 31 via duct 54 then reaches a third gas-liquid contacting device 55, also referred to herein as the third DCH. The third DCH 55 is operative for further heating of the flue gas by contacting it directly with warm cooling liquid having a temperature of, for example, 35° C., which is supplied via a pipe 56. A set of nozzles 57 is operative for distributing the liquid over the gas-liquid contacting device 55, which could have the form of a structured packing, or another suitable type of gas-liquid contacting filling. The flue gas enters the third DCH 55 via duct 54 and is forwarded upwards, through the gas-liquid contacting device 55. The flue gas leaves the third DCH 55 via duct 17. The cooling liquid and the flue gas are contacted with each other in the gas-liquid contacting device 55 under exchange of heat. The cooled cooling liquid is directed to the second DCH 31 for use as warm cooling liquid therein. The flue gas leaves the third DCH 55 at a temperature of, for example, 25° C. via a gas outlet 39. The gas outlet 39 is connected to a duct 17, which is operative for forwarding the cleaned flue gas from the gas cleaning system 1 to the stack.

In the embodiment depicted in FIG. 2c, at least a portion of the liquid used in the second DCC 20 is collected and withdrawn by a liquid collection receptacle 29 and sent via pipe 53 to the second DCH 31 for reuse, the remaining, non-withdrawn liquid used in the second DCC 20 is sent to the first DCC 19 via pipe 46, at least a portion of the liquid used in the first DCC 19 is collected and sent to the third DCH 55 via pipe 56, the liquid used in the third DCH 55 is sent to the second DCH 31 and joined with the liquid coming from the second DCC 20 via pipe 53, at least a portion of the liquid used in the second DCH 31 is collected and withdrawn by a liquid collection receptacle 43 and sent via pipe 47 to the second DCC 20 for reuse, the remaining, non-withdrawn liquid used in the second DCH 31 is sent to the first DCH 30, the liquid used in the first DCH 30 is collected and sent to the third DCC 49 via pipe 50, the liquid used in the third DCC 49 is sent to the second DCC 20 and joined with the liquid coming from the second DCH 31 via pipe 47, and the liquid used in the first DCH 30 is collected and sent to the third DCC 49.

The portion of liquid withdrawn by each of the liquid collection receptacles 29 and 43 may be varied by means of a liquid flow regulating device 42, 67, such as for example a valve. The portion may be variable between 0-100% of the used liquid coming from the gas-liquid contacting device, such as in the range of 1-99%, 10-90%. Preferably, a major amount of the liquid may be withdrawn by each liquid collection receptacle, i.e. more than 50% but less than 100%, such as more than 60%, 70%, 80% or 90% but less than 100%. In an embodiment, as shown in FIG. 2c, the withdrawal may be performed by withdrawing essentially all of the used liquid coming from the second DCC 20 and DCH 31 and then returning a desired portion (generally less than 50%) of the withdrawn liquid to the first DCC 19 and DCH 30, respectively, and forwarding the remaining portion (generally more than 50%) of the withdrawn liquid to the second DCH 31 and DCC 20, respectively.

The incoming flue gas processed in a conventional air pollution control system contains residual sulfur dioxide, $SO_2$, that was not captured in the sulfur dioxide removal device, described hereinbefore. The first DCC 19 is also a high efficiency $SO_2$ absorber operating at low temperature and in the pH range of about 4-6. Absorption of $SO_2$ into a cooling liquid containing water makes the cooling liquid slightly acidic.

Practically all the residual $SO_2$ in the flue gas will be captured in the first DCC 19 as well as a major portion of the sulfur trioxide, $SO_3$. The pH control requires a balancing act as will be explained later. Due to the low concentration of $SO_2$ in the flue gas, as mentioned hereinbefore the concentration of $SO_2$ in the incoming flue gas would typically be 20-200 ppm, the sulfite, $SO_3^{2-}$ (aq), formed in the first DCC 19 as a result of the absorption of $SO_2$ in the cooling liquid would naturally become oxidized to sulfate. The sulfuric acid, $H_2SO_4$, thus formed will dissociate in the aqueous solution, and will decrease the pH of the cooling liquid.

The cooling liquid leaving the first DCC 19 via the pipe 56 has a rather low pH, thanks to the absorption of $SO_2$, and is utilized, as will be described hereinafter, for removing ammonia from the flue gas, which is forwarded from the $CO_2$ removal stage 5 via the duct 16, in the post conditioning section 4.

The flue gas, from which most of the carbon dioxide has been removed, enters the first DCH 30 via the gas inlet 32. The flue gas entering the first DCH 30 contains about 100-1000 ppm of ammonia, $NH_3$, and more typically 200-400 ppm of ammonia, depending on the design and operating conditions of the ammonia wash system, i.e., the water wash vessel described hereinbefore. For environmental reasons and in order to reduce ammonia losses from the process, the ammonia concentration of the flue gas discharged to the atmosphere should be lower than about 10 ppm, and preferably less than about 1 ppm. This can be achieved in the post-conditioning section 4.

Hence, the pre-conditioning section 3 serves to cool the flue gas supplied via the duct 18, to remove sulfur dioxide, $SO_2$, from this flue gas, and to generate at least one slightly acidic and heated cooling liquid stream. The post-conditioning section 4 serves to heat the flue gas supplied via the duct 16, to remove ammonia, $NH_3$, from this flue gas, utilizing the slightly acidic cooling liquid obtained in the pre-conditioning section 3, the slightly acidic cooling liquid thereby being neutralized, and to cool the cooling liquid supplied from pre-conditioning section 3.

A gas cleaning system according to this embodiment gives the advantage of allowing heat transfer, $SO_2$ removal and $NH_3$ removal to be optimized simultaneously. In the embodiment of FIG. 2c, $NH_3$ removal may be optimized by the provision of a final gas-liquid contacting step in the post-conditioning section 4 wherein the cooling liquid has a low pH value due to a low liquid mass flow rate in the first DCC 19 and in the third DCH 55, $SO_2$ removal may be optimized by the provision of a final gas-liquid contacting step in the pre-conditioning section 3 wherein the cooling liquid has a high pH value due to a low liquid mass flow rate in the first DCH 30 and in the third DCC 49, and optimal cooling of the incoming flue gas and cold recovery from the treated flue gas may be maintained due to a high liquid mass flow rate in the second DCC 20 and in the second DCH 31.

Referring to the embodiment described in FIG. 2c, the operation of the gas conditioning stage can be summarized as follows.

The first DCC is designated to absorb a major portion of $SO_2$ using a minimum amount of cooling liquid. As a major portion of the $SO_2$ is absorbed in a low mass flow of cooling liquid, the pH of the liquid will decrease considerably as it is contacted with the gas. If required, the pH can be lowered further by injecting sulfuric acid into the cooling liquid.

The second DCC is designated as the main gas cooling section and operates with a high mass flow of cooling liquid at an intermediate pH (for example a pH of about 6). In the second DCC the $SO_2$ content of the flue gas can be further reduced, and a major portion of the water vapor contained in the flue gas may be condensed. A portion of the used cooling liquid from the second DCC is withdrawn, and sent to the second DCH, optionally via a cooling tower, and the remaining portion is sent to the first DCC.

The third DCC is designated for final cooling and final removal of residual $SO_2$ from the flue gas. The third DCC uses an appropriately matched amount of cooling liquid from the first DCH to cool the flue gas to a temperature as close as possible to that of the cooling liquid from the first DCH. As the cooling liquid from the first DCH is cold and has, due to its $NH_3$ content, a relatively high pH (for example a pH of about 6.5 or higher), it is also very well suited for removing residual $SO_2$ from the flue gas.

The first DCH is designated for final cooling of the cooling liquid before it is sent to the third DCC. The first DCH uses an appropriately matched flow rate of cooling liquid from the second DCH to such that the integral heat capacity of the cooling liquid stream is on the same order as that of the cold flue gas stream coming from the $CO_2$ absorber.

The first DCH is also designated to absorb a major portion of $NH_3$ from the cold flue gas stream coming from the $CO_2$ absorber. As a major portion of the $NH_3$ is absorbed in a relatively low mass flow of cooling liquid, the pH of the liquid will increase considerably as it is contacted with the gas. The high pH of the cooling liquid from the first DCH makes it well suited for removal of residual $SO_2$ in the third DCC. If required, the pH can be increased further by injecting ammonia or aqueous ammonia solution into the cooling liquid.

The second DCH is designated as the main cooling liquid cooling section and operates with a high mass flow of cooling liquid at an intermediate pH (for example a pH of about 6) coming from the second DCC. In the second DCH the $NH_3$ content of the flue gas can be further reduced as the cooling liquid is cooled against the flue gas stream coming from the first DCH. A portion of the used cooling liquid from the second DCH is withdrawn, and sent to the second DCC, and the remaining portion is sent to the first DCH.

The third DCH is designated for final removal of residual $SO_2$ from the flue gas. The third DCH uses cooling liquid coming from the first DCC, which has a low pH (for example a pH of about 5 or lower) to remove trace amounts of $NH_3$ from the flue gas stream.

Hereinbelow a number of additional features will be described, that are useful in combination with the embodiments described above.

Referring to the embodiments described herein, if the amount of sulfur dioxide, $SO_2$, of the flue gas supplied to the pre-conditioning section 3 via the duct 18 is less than what is required to react and neutralize the ammonia that is emitted from the process, i.e., the carbon dioxide removal process occurring in the $CO_2$ removal stage described hereinbefore with reference to FIG. 1, and is contained in the flue gas supplied to the post-conditioning section 4, then a balancing act is required.

This may be achieved for example by adding sulfuric acid to the loop to maintain the pH. The acid can be added anywhere in the loop, and preferably to the bottom of the pre-conditioning section 3. In FIGS. 2a, 2b and 2c, a pipe 59 is operative for supplying sulfuric acid to the cooling liquid.

If the amount of $NH_3$ in the flue gas supplied to the post-conditioning section 4 via the duct 16 is less than required to react and neutralize the sulfuric acid formed from $SO_2$ that is emitted from the sulfur dioxide removal system 58, described hereinbefore with reference to FIG. 1, then the ammonia concentration can be increased by addition of ammonia or an aqueous ammonia solution, for example from the ammoniated liquid loops of the $CO_2$ removal stage 5. In FIGS. 2a, 2b and 2c, a pipe 60 is operative for supplying $NH_3$ to the cooling liquid.

Ammonium sulfate formed in the cooling liquid by reaction of the ammonia with the sulfate may be removed from the gas conditioning stage 2 as a bleed liquid stream leaving the tank 25 of the first DCC 19 via pipe 61. If required, fresh water may be supplied as make-up to keep the liquid volume constant.

If desired, the cooling liquid streams between the pre-conditioning section and the post-conditioning section may be balanced by means of one or more liquid interconnections. For example, referring to FIG. 2c, pipes 53 and 47 are connected by interconnection A 62, and pipes 47 and 50 are connected by interconnection B 63. Interconnections A and B allow transfer of cooling liquid between the different cooling liquid loops for fine-tuning of, for example, pH, temperature and flow rate.

A control device 64 may be operative for controlling the operation of the gas conditioning stage 2. The control device may comprise an automatic controller, which may be a general-purpose computer, application specific computing device or other programmable controller. The control device 64 may comprise sensors for automated or manual measurement of relevant parameters, such as e.g. temperature, pH or ammonia concentration. For example, a pH-meter may be operative for measuring the pH of the warm cooling liquid leaving the first DCC 19 and for sending a signal containing information about the measured pH to the control device 64. In response to such a signal the control device 64 may control the supply of sulfuric acid via the pipe 59. Additionally, or as alternative, the control device may control the valves 65, 66, 67, 68 to increase or decrease the cooling liquid mass flow rate in the first DCC 19 and/or the first DCH 30. Additionally, or as alternative, the control device 64 may control the sulfur dioxide removal device 58, and/or the water wash vessel 14, both of which have been described hereinbefore with reference to FIG. 1. Still further, the control device 64 may also control a supply of an alkali, such as ammonia or sodium hydroxide solution, via the pipe 60, in situations when the measured pH becomes too low, and has to be increased quickly. The control device 64 may also receive a signal from an ammonia concentration analyzer, which is operative for measuring the concentration of ammonia in the flue gas leaving the gas conditioning stage 2.

In all embodiments, the cooling liquids used in the pre-conditioning section 3, which are directed for reuse in the post-conditioning section 4 can be cooled prior to their introduction into the gas-liquid contacting devices of the post-conditioning section.

In FIG. 2a, a pipe 40 is operative for forwarding the cooling liquid from the second DCC to the first DCH. The cooling liquid is forwarded via a cooling tower 71. Ambient air is supplied via an inlet duct to the cooling tower and cools the warm cooling liquid in accordance with the well-known principles of cooling towers. The heated ambient air leaves the cooling tower 71 via an outlet duct. The cooled cooling liquid leaves the cooling tower at a temperature of about 25° C.

In FIG. 2c the pipe 53 is operative for forwarding the cooling liquid from second DCC to the second DCH. The cooling liquid is forwarded via a cooling tower 71. The cooled cooling liquid leaves the cooling tower at a temperature of about 25° C. Furthermore, the cooling liquid forwarded in pipe 56 to the third DCH 55 may be cooled or heated by means of a heat exchanger 72.

The gas-liquid contacting devices of the gas conditioning stage are preferably counter-current gas-liquid contacting vessels. At least some of the vessels are preferably designed to achieve low temperature difference on both ends of the vessel, i.e. a low temperature difference between incoming gas and exiting liquid at one end of the device, and a low temperature difference between incoming liquid and exiting gas at the other end of the device.

Referring to the embodiment of FIG. 2c, the temperature difference at the top of the third DCC 49, i.e., between the cold cooling liquid supplied via the pipe 50 and the flue gas about to leave the third DCC 49, is designed to be less than 3° C., and preferably about 0.6° C. Similarly, the temperature difference at the bottom of the third DCC 49, i.e., between the warm cooling liquid leaving the third DCC and the flue gas about to enter the third DCC, is designed to be less than 3° C., and preferably about 0.6° C. Lowering the temperature difference results in maximum cooling of the flue gas and maximum heating of the cooling liquid. Lowering the temperature of the flue gas that is about to leave the third DCC 49, saves cooling power downstream in the process.

The temperature difference at the top of the first DCH 30, i.e., between the warm cooling liquid supplied via the pipe 52 and the flue gas about to leave the first DCH, is designed to be less than 3° C., and preferably about 0.6° C. Similarly, the temperature difference at the bottom of the first DCH 30, i.e., between the cooled cooling liquid leaving the first DCH and the flue gas about to enter the first DCH, is designed to be less than 3° C., and preferably about 0.6° C.

The possibility in embodiments described herein of adjusting the cooling liquid mass flow rate through the first DCH and the final DCC, independently of the mass flow rate in the other gas-liquid contacting devices allows the temperature differences in both of these gas-liquid contacting devices to be minimized. Lowering the temperature difference results in maximum cooling of the flue gas and maximum heating of the cooling liquid. Lowering the temperature of the flue gas, that is about to leave the final DCC, saves cooling power downstream in the process.

Advantages provided by embodiments described herein include:

1) More effective reduction of $NH_3$ emissions. The cooling liquid fed to the final DCH is especially suited for removal of trace amounts of $NH_3$ from the flue gas stream, as it has a low pH. Since the arrangement in the aspects described herein allows a lower liquid mass flow rate in this DCH, additional acid injected to lower the pH more efficiently.

2) Optimized cold recovery from the cold flue gas independently of other variables. By optimizing the liquid mass flow rate through the final DCC and the first DCH, the transfer of cold energy from the gas stream discharged from the $CO_2$ removal stage to the gas stream to be fed to the $CO_2$ removal stage may be optimized. Thus the refrigeration requirement in the $CO_2$ removal stage can be kept independent from the gas conditioning stage and minimized.

3) Improved tolerance to high $SO_2$ levels and $SO_2$ peak shaving. High $SO_2$ concentrations or peaks of $SO_2$ in the feed gas will be reduced efficiently already in the first DCC, sending the gas with a "shaved" residual $SO_2$ content upwards to the second DCC.

4) Improved $SO_2$ fine-purification. In the final DCC a portion of cooling liquid, which is cold and relatively high in pH, is contacted with the flue gas stream. This liquid is well suited for removing the last traces of $SO_2$ from the flue gas stream before it is sent to the $CO_2$ removal stage. Less $SO_2$ in the flue gas stream sent to the $CO_2$ removal stage leads to less unwanted ammonium sulfate formation in the $CO_2$ absorption liquid comprising ammonia, thereby reducing the ammonia make-up requirement.

5) Improved control of water balance in the gas conditioning stage. The temperature of the cooling liquid stream sent to the third DCH can be individually controlled, such that the exit temperature of the clean flue gas, is no longer directly coupled to the temperature of cooling liquid stream fed to the second DCH, which is defined by the exit temperature of the cooling tower. The cooling tower as well as the clean flue gas stream are the two main exits for water vapor from the gas conditioning stage. In embodiments described herein, the exit temperature of the clean flue gas can be higher than the cooling tower outlet temperature, such that more water vapor leaves the system with the clean gas stream, making it easier to adjust the water balance of the gas conditioning stage.

6) General Flexibility in optimization of the system. The liquid mass flow rates can be controlled individually and often decoupled, such that there are degrees of freedom for adjusting the targeted process parameters independently.

All features and advantages described herein are applicable to both the gas purification system and the method for cleaning a gas stream of the different aspect described herein. In different embodiments thereof, the method is performed in an embodiment of the gas purification system as described hereinabove with reference to FIGS. 1 and 2a-2c, wherein the upstream gas-liquid contacting devices in the method correspond to the gas-liquid contacting devices of the pre-conditioning section of the system, and the downstream gas-liquid contacting devices in the method correspond to the gas-liquid contacting devices of the post-conditioning section of the system.

It is realized that a range of modifications to the described embodiments are possible, including the addition of further gas-liquid contacting devices to the pre- and post-conditioning sections and additional connections for withdrawing liquid from between two gas-liquid contacting devices of the pre-conditioning section or the post-conditioning section and forwarding the withdrawn liquid to a gas-liquid contacting device of the other section. Examples of such combinations may include a system having four or more gas-liquid contacting devices in each of the pre- and post-conditioning sections and three or more connections for withdrawing liquid from between two gas-liquid contacting devices of the pre-conditioning section or the post-conditioning section and forwarding the withdrawn liquid to a gas-liquid contacting device of the other section.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for cleaning a gas stream containing carbon dioxide and sulfur dioxide, said method including removing, at least partly, carbon dioxide from the gas stream in a carbon dioxide removal step by bringing the gas stream into contact with a liquid comprising ammonia such that the gas stream is depleted in carbon dioxide and enriched in ammonia, said method comprising the steps of:
- a) bringing the gas stream into direct contact with a liquid stream in a first upstream gas-liquid contacting device upstream of the carbon dioxide removal step, cooling the gas stream, and absorbing into the liquid at least a part of the sulfur dioxide of the gas stream such that the gas stream is depleted in sulfur dioxide and said liquid stream is enriched in sulfate,
- b) bringing the gas stream depleted in sulfur dioxide into direct contact with a liquid stream in a second upstream gas-liquid contacting device upstream of the carbon dioxide removal step, cooling the gas stream, and absorbing into the liquid at least a part of the sulfur dioxide of the gas stream such that the gas stream is depleted in sulfur dioxide and said liquid stream is enriched in sulfate,
- c) removing, at least partly, carbon dioxide from the gas stream by bringing the gas stream depleted in sulfur dioxide into contact with a liquid comprising ammonia such that the gas stream is depleted in carbon dioxide,
- d) bringing the gas stream depleted in carbon dioxide into contact with a liquid stream enriched in sulfate in a first downstream gas-liquid contacting device downstream of the carbon dioxide removal step, cooling the liquid stream, and absorbing into the liquid at least a part of the ammonia of the gas stream such that the gas stream is depleted in ammonia and said liquid stream is enriched in ammonia,
- e) bringing the gas stream depleted in ammonia into contact with a liquid stream enriched in sulfate in a second downstream gas-liquid contacting device downstream of the carbon dioxide removal step, cooling the liquid stream, and absorbing into the liquid at least a part of the ammonia of the gas stream such that the gas stream is depleted in ammonia and said liquid stream is enriched in ammonia,
- f) withdrawing at least a portion of the liquid stream used in the second upstream gas-liquid contacting device and reusing the withdrawn liquid in a downstream gas-liquid contacting device and forwarding the remaining portion to the first upstream gas-liquid contacting device, or withdrawing at least a portion of the liquid stream used in the second downstream gas-liquid contacting device and reusing the withdrawn liquid in an upstream gas-liquid contacting device and forwarding the remaining portion to the first downstream gas-liquid contacting device.

2. The method according to claim 1, wherein in step f) at least a portion of the liquid stream used in the second upstream gas-liquid contacting device, is reused in the first downstream gas-liquid contacting device.

3. The method according to claim 1, wherein in step f) at least a portion of the liquid stream used in the second downstream gas-liquid contacting device, is reused in the first upstream gas-liquid contacting device.

4. The method according to claim 1, further comprising the steps:
- b1) bringing the gas stream depleted in sulfur dioxide from step b) into direct contact with a liquid stream in a third upstream gas-liquid contacting device upstream of the carbon dioxide removal, cooling the gas stream, and absorbing into the liquid at least a part of the sulfur dioxide of the gas stream such that the gas stream is depleted in sulfur dioxide and said liquid stream is enriched in sulfate, and
- e1) bringing the gas stream depleted in ammonia from step e) into contact with a liquid stream enriched in sulfate in a third downstream gas-liquid contacting device downstream of the carbon dioxide removal, cooling the liquid stream, and absorbing into the liquid at least a part of the ammonia of the gas stream such that the gas stream is depleted in ammonia and said liquid stream is enriched in ammonia, and wherein step f) comprises withdrawing at least a portion of the liquid stream used in the second upstream gas-liquid contacting device and reusing the withdrawn liquid in a downstream gas-liquid contacting device, and withdrawing at least a portion of the liquid stream used in the second downstream gas-liquid contacting device and reusing the withdrawn liquid in an upstream gas-liquid contacting device.

5. A method for cleaning a gas stream containing carbon dioxide and sulfur dioxide, said method including removing, at least partly, carbon dioxide from the gas stream in a carbon dioxide removal step by bringing the gas stream into contact with a liquid comprising ammonia such that the gas stream is depleted in carbon dioxide and enriched in ammonia, said method comprising the steps of:
- a) bringing the gas stream into direct contact with a liquid stream in a first upstream gas-liquid contacting device upstream of the carbon dioxide removal step, cooling the gas stream, and absorbing into the liquid at least a part of the sulfur dioxide of the gas stream such that the gas stream is depleted in sulfur dioxide and said liquid stream is enriched in sulfate,
- b) bringing the gas stream depleted in sulfur dioxide into direct contact with a liquid stream in a second upstream gas-liquid contacting device upstream of the carbon dioxide removal step, cooling the gas stream, and absorbing into the liquid at least a part of the sulfur dioxide of the gas stream such that the gas stream is depleted in sulfur dioxide and said liquid stream is enriched in sulfate,
- c) removing, at least partly, carbon dioxide from the gas stream by bringing the gas stream depleted in sulfur dioxide into contact with a liquid comprising ammonia such that the gas stream is depleted in carbon dioxide,
- d) bringing the gas stream depleted in carbon dioxide into contact with a liquid stream enriched in sulfate in a first downstream gas-liquid contacting device downstream of the carbon dioxide removal step, cooling the liquid stream, and absorbing into the liquid at least a part of the ammonia of the gas stream such that the gas stream is depleted in ammonia and said liquid stream is enriched in ammonia,
- e) bringing the gas stream depleted in ammonia into contact with a liquid stream enriched in sulfate in a second downstream gas-liquid contacting device downstream of the carbon dioxide removal step, cooling the liquid stream, and absorbing into the liquid at least a part of the ammonia of the gas stream such that the gas stream is depleted in ammonia and said liquid stream is enriched in ammonia,
- f) withdrawing at least a portion of the liquid stream used in the second upstream gas-liquid contacting device and reusing the withdrawn liquid in a downstream gas-liquid contacting device, or withdrawing at least a portion of the liquid stream used in the second downstream gas-liquid contacting device and reusing the withdrawn liquid in an upstream gas-liquid contacting device; and
further comprising the steps of:

b1) bringing the gas stream depleted in sulfur dioxide from step b) into direct contact with a liquid stream in a third upstream gas-liquid contacting device upstream of the carbon dioxide removal, cooling the gas stream, and absorbing into the liquid at least a part of the sulfur dioxide of the gas stream such that the gas stream is depleted in sulfur dioxide and said liquid stream is enriched in sulfate, and e1) bringing the gas stream depleted in ammonia from step e) into contact with a liquid stream enriched in sulfate in a third downstream gas-liquid contacting device downstream of the carbon dioxide removal, cooling the liquid stream, and absorbing into the liquid at least a part of the ammonia of the gas stream such that the gas stream is depleted in ammonia and said liquid stream is enriched in ammonia; and wherein in step f) a major portion of the liquid stream used in the second upstream gas-liquid contacting device is withdrawn and reused in the second downstream gas-liquid contacting device and a minor portion of the liquid stream used in the upstream second gas-liquid contacting device is reused in the first upstream gas-liquid contacting device, and a major portion of the liquid stream used in the second downstream gas-liquid contacting device is withdrawn and reused in the second upstream gas-liquid contacting device and a minor portion of the liquid stream used in the second downstream gas-liquid contacting device is reused in the first downstream gas-liquid contacting device.

6. The method according to claim 4, wherein used liquid from the first upstream gas-liquid contacting device is reused in the third downstream gas-liquid contacting device.

7. The method according to claim 4, wherein used liquid from the first downstream gas-liquid contacting device is reused in the third upstream gas-liquid contacting device.

8. The method according to claim 4, wherein the liquid stream which is brought into contact with the gas stream in e1) has a pH of <6.5.

9. The method according to claim 4, wherein the liquid stream which is brought into contact with the gas stream in step b1) has a pH of >6.5.

10. The method according to claim 4, wherein the liquid flow rate in steps b1) and/or d) is controlled such that in at least one of the steps b1) and/or d) the integral heat capacities of the gas stream and the liquid stream entering the gas-liquid contacting device differ by less than 10%.

* * * * *